INVENTORS
FREELAND R. GOLDAMMER
JOHN A. GONDEK
BY
ATTORNEY

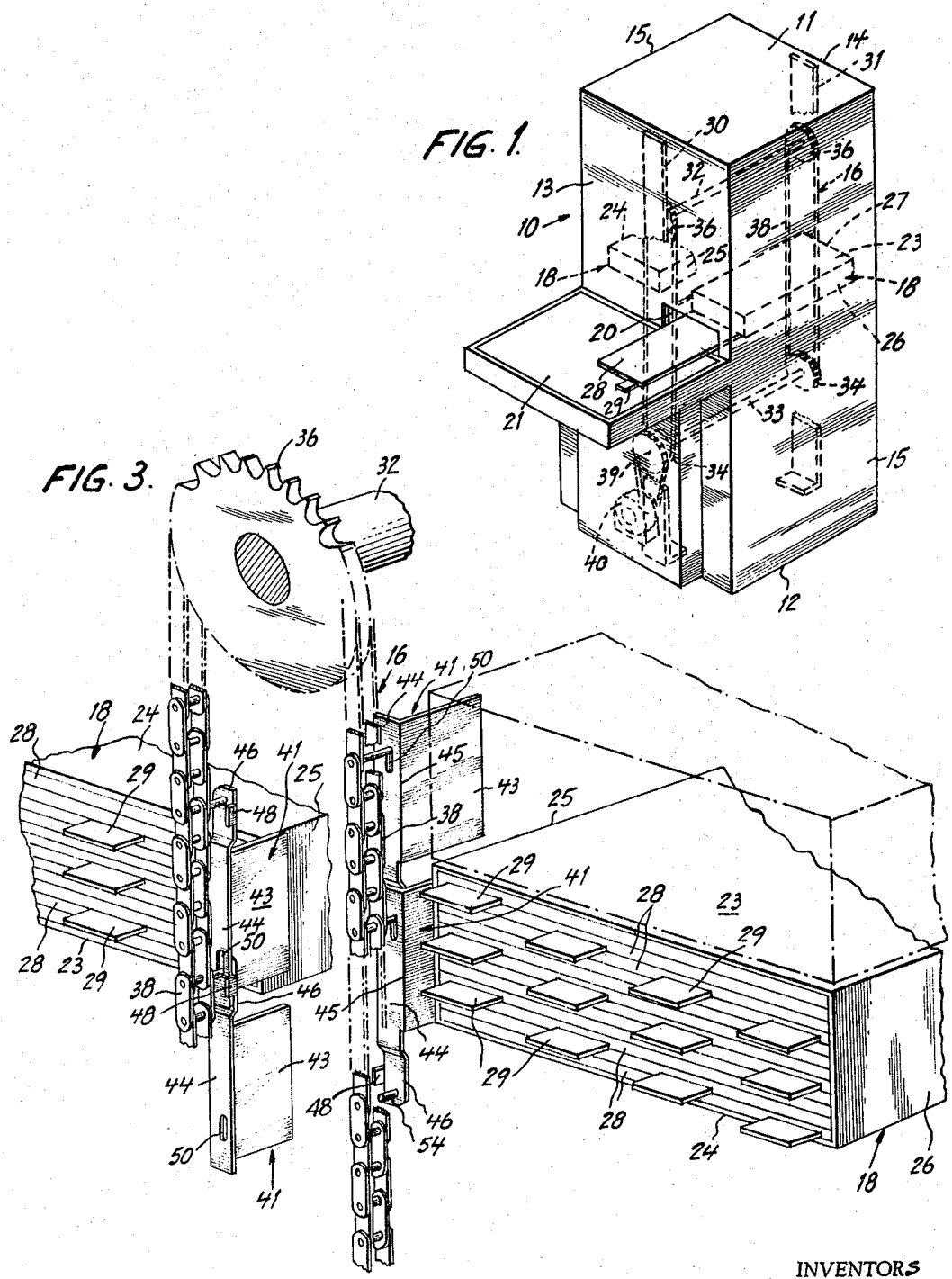

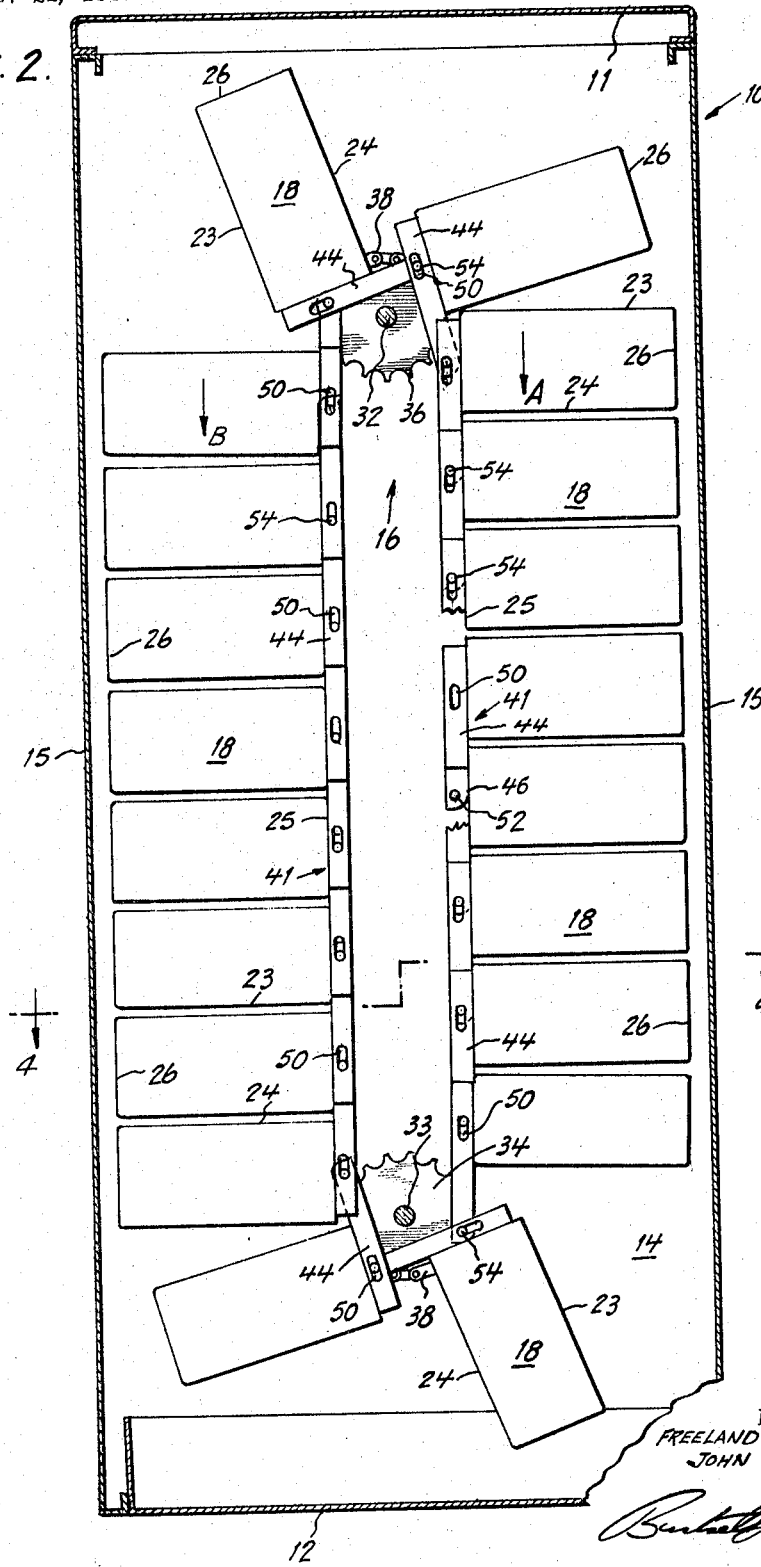

United States Patent Office 3,317,029
Patented May 2, 1967

---

3,317,029
ARTICLE STORAGE EQUIPMENT
Freeland R. Goldammer, Williamsville, and John A. Gondek, North Tonawanda, N.Y., assignors to Sperry Rand Corporation, New York, N.Y., a corporation of Delaware
Filed Oct. 22, 1965, Ser. No. 502,200
4 Claims. (Cl. 198—158)

The present invention is directed to new and useful improvements in conveyor driven article storage equipment and more particularly to a linkage arrangement for use therein.

Conveyor driven article storage equipment, as for example mechanized filing or reference units, wherein a plurality of article carriers are suspended from a pair of spaced roller chains by linkage arrangements such as comprising brackets, lever arms or the like which interconnect the carriers to the chains are well known. In some units of this type, the roller chains are each trained about a pair of vertically spaced sprocket wheels arranged at spaced sidewalls in the unit and which chains are adapted to move the article carriers in vertical paths relative to the upright walls of the unit to and past a work station whereat the contents of a selected carrier are made available to an operator. At the top and bottom of the unit, the carriers move in non-vertical or arcuate paths as the chains mesh with and pass over the sprocket wheels.

In equipment of this type, various means have been used in the past to stabilize the carriers to prevent dipping of the outer ends thereof. In additon, means are provided to guide the chains through the vertical paths of travel to prevent sagging of the chains caused by forces imparted thereto by the weight of the carriers which are transmitted through the linkage to the chains. Problems have been encountered in providing an economical linkage arrangement which not only effectively alleviates these conditions but which concurrently allows for maximum utilization of the storage capacity of the unit without the suspended article carriers interferring one with the other during movement of the linkage connections through the vertical paths and escapement therefrom into the non-vertical paths of travel about the sprocket wheels.

It is an object of the present invention to provide a novel linkage arrangement for conveyor driven article storage equipment.

Another object is to provide a novel linkage arrangement wherein the sagging of the conveyor chains of a conveyor driven article storage unit is prevented without the necessity of providing guide tracks or the like for the chains in the vertical paths of travel.

Another object is to provide a novel linkage arrangement wherein novel means is provided for interconnecting the linkage means of adjacent article carriers to stabilize the carriers in the vertical paths of travel.

A still further object is to provide a novel linkage arrangement which allows for maximum utilization of the storage capacity of the unit and includes novel escapement means whereby the carriers move from the vertical to the non-vertical paths of travel in the unit without interferring with adjacent carriers on the conveyor.

The present invention contemplates a novel linkage arrangement for conveyor driven article storage equipment. In one embodiment spaced sprocket wheel driven conveyor chains move a plurality of closely stacked article carriers through an orbital path of travel to and past a work station. The carriers are disposed between the chains and are suspended therefrom by a bracket member at each end of the carrier. Each bracket member is connected to a conveyor chain at spaced points thereon with one point of connection being a fixed pivotal connection to the chain and the other a loose pivotal connection thereon. The loose pivotal connection of each bracket member has a common point of attachment on the chain with the fixed pivotal connection of the next adjacent carrier whereby all the brackets on each chain are interconnected one with the other to provide a rigid column for stabilizing the carriers in their vertical paths of travel to prevent sagging of the chains and dipping of the outer ends of the carriers. Each bracket member is attached to a carrier in an offset position relative to the carrier sidewall whereby novel escapement means are provided to avoid interference of adjacent carriers during passage thereof from the vertical path into the non-vertical path of travel about the sprocket wheels.

The above and other objects and advantages of the present invention will appear more fully hereinafter from a consideration of the detailed description which follows taken together with the accompanying drawings wherein one embodiment of the invention is illustrated.

In the drawings:

FIG. 1 is a perspective view of a mechanized conveyor driven reference unit in which an embodiment of the novel linkage arrangement of the present invention is incorporated;

FIG. 2 is a front elevational view of the unit shown in FIG. 1 with the front wall thereof removed to more particularly show the linkage arrangement at the front of the reference unit;

FIG. 3 is a fragmentary perspective front view of two carriers and shows the linkage connections thereof with one of the conveyor chains;

Figure 4:
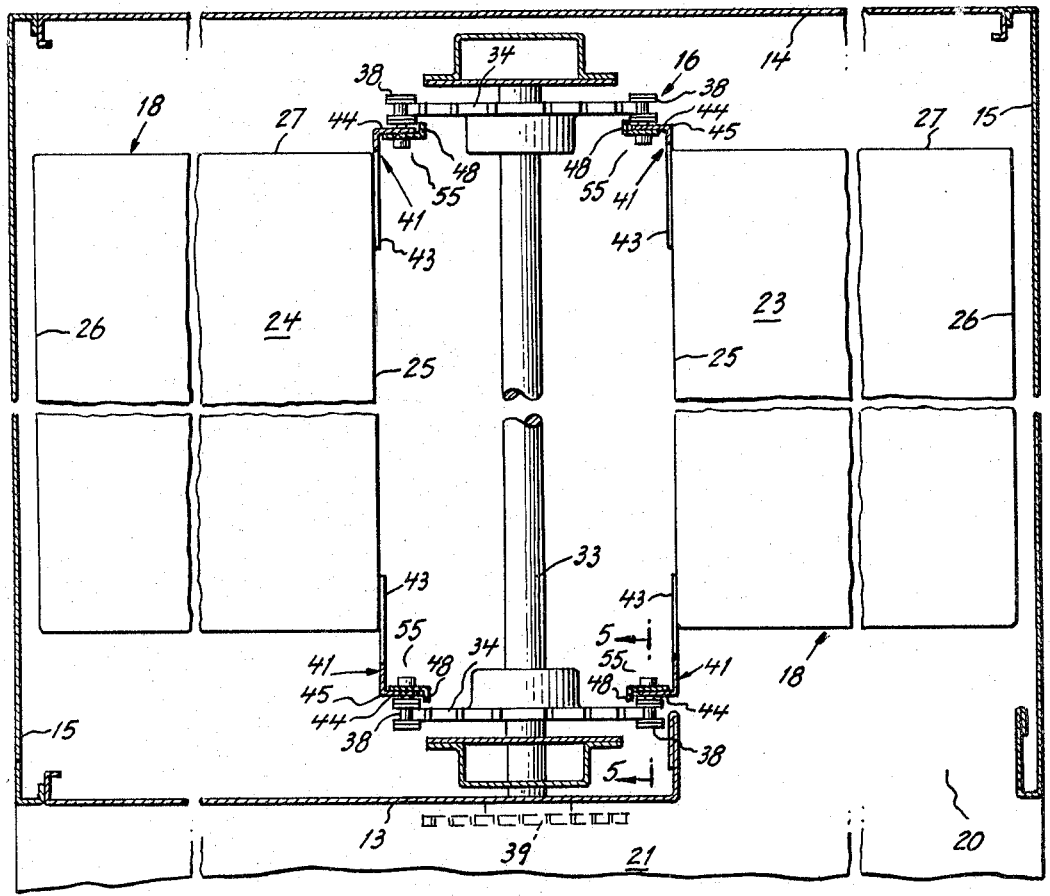
FIG. 4 is a sectional view taken on the line 4—4 of FIG. 2.

Referring now to the drawings for a more detailed description of the present invention a conveyor driven mechanized reference unit is generally indicated by the reference numeral 10 (FIGS. 1 and 2) and indicates by way of example, a conveyor driven article storage unit which incorporates an embodiment of the present invention.

Reference unit 10 includes top, bottom, front, rear and spaced sidewalls 11, 12, 13, 14 and 15 (FIGS. 1 and 2) respectively and houses therein a conveyor system generally indicated by the reference numeral 16 from which is suspended a plurality of article carriers 18. An access opening 20 (FIG. 1) is provided in front wall 13 of unit 10 adjacent the work surface of a table 21 which projects outwardly from front wall 13 and through which access opening 20 is accessible the contents of a selected one of the article carriers 18 positioned thereat.

Each carrier 18 (FIG. 3) is of box-like configuration and includes top and bottom walls 23 and 24 and spaced sidewalls 25–26. Carriers 18 further include a rear wall 27 (FIG. 1) and are open at the front thereof. Each carrier 18 contains therein a plurality of vertically spaced panels or slides 28 (FIGS. 1 and 3) having handle projections 29 which project outwardly of the open end of the carrier. Panels 28 are of any well known construction and may contain thereon any suitable information such as alphabetical listings or the like arranged according to the selected needs of a user. As shown with respect to one panel 28 in FIG. 1, panels 28 are slidable into and out of the open end of the carrier at access opening 20 onto table 21 through grasping of a handle projection 29.

A pair of spaced vertical support members 30 and 31 (FIG. 1) are arranged within unit 10 at front and rear walls 13 and 14 thereof and which support members 30–31 have journaled therein upper and lower horizontal shaft members 32 and 33. A pair of spaced sprocket wheels 34 are mounted on lower shaft 33 and each sprocket wheel 34 is arranged in vertical alignment with one of a pair of idler sprocket wheels 36 on upper shaft 32. A roller chain 38 is trained about each pair of sprocket wheels 34–36 and which chains 38 have portions at the upper and lower portions of unit 10 in meshed engagement with sprocket wheels 34–36. A third sprocket wheel 39 is mounted on lower shaft 33 and which sprocket wheel 39 is chain driven from a reversible motor 40 in any well known manner whereby upon operation of motor 40 conveyor chains 38 are moved in vertical paths between the pairs of sprockets 34–36 and in arcuate or non-vertical paths as the chains 38 mesh with and are driven about the sprocket wheels 34–36.

Linkage means are provided to interconnect carriers 18 to chains 30 whereby carriers are moved by chains 38 in an upright position through the vertical path as seen at the right in FIG. 2 past access opening 20 and in an inverted position as they move through the vertical path at the left in FIG. 2. Linkage means comprises a pair of bracket members 41 secured to the opposite ends of sidewall 25 of each carrier 18. The linkage means is identical at both front and rear walls 13 and 14 of unit 10 and description thereof hereinafter will therefore be directed only to the linkage means at front wall 13 (FIGS. 2, 3, and 5).

Each bracket member 41 (FIG. 3) includes a flat plate wall portion 43 with an elongated flange portion 44 bent at a right angle from an edge 45 (FIG. 3) of plate portion 43. Plate portion 43 is secured to the outer surface sidewall 25 of carrier 18 in any suitable manner such as by welding. Flange 44 of bracket 41 is disposed adjacent chain 38 and includes an offset foot portion 46 which projects beyond bottom wall 24 of carrier 18 and is provided with an angled guide tab 48 on one edge thereof for purposes to be explained.

Means are provided on brackets 41 to connect brackets 41 to spaced points of attachment on chain 38 and which means include an elongated slot 50 formed in the upper portion of flange 44 and a rounded aperture 52 formed in foot portion 46. Slot 50 and aperture 52 are offset on bracket 41 in relation respectively with top wall 23 and bottom wall 24 of a carrier 18. Spaced extended link connecting pins 54 (FIG. 3) of roller chain 38 provide points of attachment on chain 38 for brackets 41 and which pins 54 project through aperture 52 and the upper end of slot 50 to suspend carrier 18 from chain 38. Caps 55 (FIGS. 4 and 5) are secured to the ends of extended pins 54 to prevent accidental disengagement of bracket 41 from chain 38. Each bracket 41 is thereby provided with a fixed pivotal connection to chain 38 at aperture 52 with bracket 41 being fixed in position on chain 38 at aperture 52 but with edges of aperture 52 being pivoted on the pin 54 projecting therethrough. A second or loose pivotal connection with chain 38 is thereby also provided at slot 50 with the pin 54 therein being movable along slot 50 and the edges of the slot 50 being pivotal against the pin in a manner to be described during movement of the carriers through the non-vertical paths.

Figure 5:
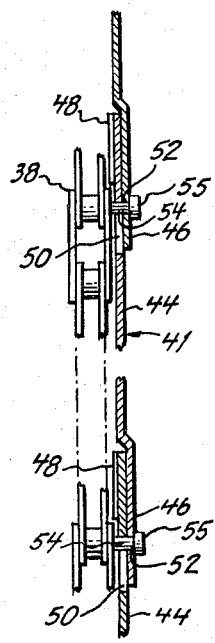
FIG. 5 is a sectional view taken on the line 5—5 of FIG. 4.

As seen in FIGS. 2, 3 and 5 each fixed pivotal connection of a bracket 41 at aperture 52 has a common point of attachment on chain 38 with the loose pivotal connection at the slot 50 of the bracket 41 of the next adjacent carrier on chain 38. Each foot portion 46 of a bracket 41 is nested with the flange portion 44 of the next adjacent carrier 18 with the tab 48 thereon abutting the side edge of the flange 44 (as shown at the left in FIG. 3) of the bracket 41 of the adjacent carrier. In this manner all brackets 41 on chain interconnected one with the other.

In operation, any well known control means may be employed to move carriers 18 in either a clockwise or counterclockwise directions as selected and as indicated by the arrows A and B respectively in FIG. 2 to position a selected carrier 18 at access opening 20. Upon operation of motor 40, sprocket wheel 39 is driven to thereby rotate lower shaft 33 and sprocket wheels 34 which drive chains 38 and idler sprocket wheels 36 to move chains 38 and carriers 18. As carriers 18 move with chains 38 in the vertical paths of travel (at the left and right in FIG. 2) interengaged brackets 41 provide a rigid movable column-like support for carriers 18 adjacent chains 38 and stabilize carriers 18. Any tendency of the weight of one carrier 18 to pivot their brackets 41 on the chain 38 about their loose pivotal connection at slots 50 to cause a carrier 18 and the chain 38 to sag is prevented by the fixed connection of the next adjacent carrier 18 having the common point of attachment therewith on chain 38. The fixed connection acts to counteract any pivotal movement of the edges of slot 50 of the other carrier against the common connecting pin 54.

As a carrier 18 approaches the non-vertical path about either sprocket wheel 34 or 36, and if it is assumed the carriers are moved in a clockwise direction as indicated by arrow A in FIG 2, the offset foot portion 46 of the brackets 41 thereof enter the non-vertical path prior to the attached carrier. Flange 44 of the bracket is fulcrumed about pin 54 in aperture 52 as the chain 38 meshes with the sprocket wheel 34 or 36 to pivot and move the edges of slot 50 on flange 44 against its pin 54 to initiate swinging escapement of the top wall 23 of the carrier prior to the entry thereof about the sprocket wheel. If it is assumed the carriers 18 are moving counterclockwise as indicated by arrow B (FIG. 2), the opposite end or upper portion of flange 44 will enter the non-vertical path prior to foot portion 46 thereof. Under the latter conditions, bottom wall 24 of carrier 18 is swung into escapment as the edges of slot 50 pivot against its pin 54. As a result of the offsetting of the points of pivotal connections of the bracket in relation to the top and bottom walls 23–24 of a carrier 18, initiation of escapment prior to entry of the carrier into the non-vertical path is effected whereby engagement of the carrier with the next adjacent carrier on the conveyor chains 38 is averted.

As chains 38 pass from the vertical path into a non-vertical path (as shown in top and bottom of FIG 2), as previously discussed, the linear distance between a pair of extended pins 54 in slot 50 and aperture 52 of bracket member 41 decreases. Under the latter conditions pin 54 in slot 50 of the bracket 41 of the carrier 18 entering the non-vertical path moves along slot 50 decreasing the linear distance between it and the pin 54 and aperture 52 to allow the carrier to swing in an arcuate path without binding of brackets 41 on chain 38 on the sprocket wheels 34 or 36. As the carrier leaves the non-vertical path, the pin having traversed slot 50 returns to position at the end of slot 50.

It will be apparent from the foregoing description that the novel linkage arrangement has many advantages in use. One advantage among others is that the rigid column-like disposition of interconnected brackets in the vertical paths of travel of the carriers provides an effective stabilizing means to prevent dipping of the carriers and eliminates the need for guide tracks or similar guide means for the conveyor chains. Further, due to the offsetting of points of connection of the carrier to the conveyor chain, novel escapment means are provided for a carrier entering the non-vertical paths of travel without interference of one carrier with the other. Since minimum escapment clearance is effected, increased storage capacity of a conveyor unit results in that the carriers may be more closely spaced on the conveyor chains.

Although one embodiment of the present invention is illustrated and described in detail it is to be expressly understood that the invention is not limited thereto. Various changes can be made in the design and arrangement of parts without departing from the spirit and scope

What is claimed is:
1. In conveyor driven equipment of the class described,
(a) a pair of spaced vertical support members,
(b) a pair of spaced vertically aligned sprocket wheels on each of said support members,
(c) an endless conveyor chain trained about each of said pair of sprocket wheels and,
(d) a plurality of vertically spaced carriers arranged between said support members,
(e) spaced points of attachment on the conveyor chains including extended link connecting pins thereon,
(f) a bracket member at each end of a said carrier and having one end secured to the carrier,
(g) means on the other end of the bracket adapted for connection to a pair of said extended link connecting pins of an adjacent one of said conveyor chains,
(h) said connection means on the other end of a said bracket member including an aperture and an elongated slot provided thereon and mounted on said pins to provide respectively fixed pivotal connection and a loose pivotal connection with said conveyor chains,
(i) means for moving said conveyor chains and interconnected carriers in vertical paths of travel between said sprocket wheels and in non-vertical paths about said sprocket wheels,
(j) said fixed pivotal connection of each bracket having a common point of attachment on a said conveyor chain with the loose pivotal connection of the next adjacent carrier on said conveyor chain with said loose pivotal connection adapted to move relative to said fixed pivotal connection of the next adjacent carrier during the movement of its attached carrier through the non-vertical path of travel,
(k) said one end of said bracket member comprises a plate portion screwed to said carrier and said other end includes a flange portion at right angles to said plate portion and having a foot portion projecting beyond said plate portion with said slot and aperture being formed respectively in said flange portion and said foot portion.

2. In conveyor driven equipment of the class described,
(a) a pair of spaced vertical support members,
(b) a pair of spaced vertically aligned sprocket wheels on each of said support members,
(c) an endless conveyor chain trained about each of said pair of sprocket wheels and,
(d) a plurality of vertically spaced carriers arranged between said support members,
(e) a plurality of spaced points of attachment on each conveyor chain including extended link connecting pins,
(f) a bracket member at each end of a said carrier,
(g) each bracket having a plate portion secured to the carrier and a flange portion,
(h) said flange portion having a rounded aperture and an elongated slot connected to a pair of said spaced extended pins on an adjacent one of said conveyor chains,
(i) said connections of said bracket member to said chain at said aperture providing a fixed pivotal connection and at said slot a loose pivotal connection,
(j) said fixed pivotal connections of each of said brackets having a common point of attachment on an extended pin with the loose pivotal connection of the next adjacent carrier whereby all of said brackets are interconnected one with the other on said conveyor chain, and
(k) means for moving said conveyor chains and carriers in vertical paths between the pairs of sprocket wheels and in non-vertical paths and in non-vertical paths about the sprocket wheels,
(l) said interconnected flanges of said brackets providing a rigid column in said vertical paths to stabilize carriers with said loose pivotal connection of a said carrier adapted to move relative to the fixed pivotal connection of the adjacent carrier upon entering the non-vertical paths.

3. The equipment of claim 2 wherein the said aperture and slot in a flange portion of a said bracket are arranged in offset relationship on the flange relative to upper and lower wall portions of its attached carrier to permit escapement of the carrier prior to entry thereof into the non-vertical path of travel.

4. The equipment of claim 2 wherein each of the flanges of the said brackets are each provided with a foot portion in which is contained the said aperture therein, tab means on a side edge of said foot portion, and each of said foot portions nested with the flange of the next adjacent carrier with said tab means thereon adapted to engage the flange of the said next adjacent carrier.

References Cited by the Examiner

UNITED STATES PATENTS 1,422,151  7/1922  Walker _____ 198—151
2,973,854  3/1961  Roloson _____ 198—152

FOREIGN PATENTS 1,366,836  6/1964  France.

EVON C. BLUNK, *Primary Examiner.*
RICHARD E. AEGERTER, *Examiner.*